250-203.CT AU 256 EX
26-72 XR 3,707,598

United States Patent [15] 3,707,598

Scarbrough [45] Dec. 26, 1972

[54] ELECTRONIC PATTERN RECOGNITION

[72] Inventor: Joe M. Scarbrough, Orlando, Fla.

[73] Assignee: Martin Marietta Corporation, New York, N.Y.

[22] Filed: July 2, 1969

[21] Appl. No.: 838,490

[52] U.S. Cl..........178/6.8, 178/DIG. 21, 250/203 CT
[51] Int. Cl...............................................H04n 7/18
[58] Field of Search....................178/6, 6.8, DIG. 21; 250/203 CT

[56] References Cited

UNITED STATES PATENTS 3,039,002 6/1962 Guerth...........................178/6.8 UX

*Primary Examiner*—Richard Murray
*Assistant Examiner*—Richard K. Eckert, Jr.
*Attorney*—Julian C. Renfro, John Orman and Gay Chin

[57] ABSTRACT

Method and apparatus for electronic recognition of patterns as particularly adapted to the pattern tracking of the electronic signature of an object within the field of view of a television camera.

17 Claims, 6 Drawing Figures

ELECTRONIC PATTERN RECOGNITION

BACKGROUND OF THE INVENTION

The present invention relates to electronic recognition of patterns and more particularly to the method and apparatus by which target tracking, image stabilization, area correlation, sorting, missile guidance and other related functions may be accomplished.

The machine recognition of patterns has widespread utility. Consider, by way of example, the problems associated with the matching of fingerprints by investigatory bureaus, the matching of prerecorded images with a real time video image for missile guidance, or the matching of photography in satellite photography. Each of the above and countless other applications requires the high speed comparison of one pattern with a multitude of other patterns and the recognition of the closest concurrence.

While the present invention has its applications in each of the above-mentioned environments, an understanding thereof is perhaps more easily obtained in the consideration of the invention in the embodiment of a pattern tracker wherein a given geometric pattern moving into a field of view under surveillance is recognized and the pattern automatically tracked.

Automatic tracking television systems are presently utilized in both guidance and surveillance systems in both military and industrial environments. These television systems generally include a television camera positionable in azimuth and elevation for tracking a moving target and a suitable television monitor for displaying the target information. The scanning of the camera and of the monitor are synchronized, of course, by common horizontal and vertical synchronizing pulses which may also be utilized to generate an electronic window or tracking gate. This electronic window may be superimposed on the video output signal from the camera to produce a tracking gate or electronic window on the viewing screen of the monitor. This electronic window may be movable on the viewing screen of the monitor to follow a moving target in response to variations in the magnitude of biasing control signals either manually or automatically supplied.

Prior art television tracking systems have generally required critical processing of the video output signal developed by the television camera. In addition to requiring the use of electronic circuit components capable of passing video signals without distortion, the electrical control circuitry generally includes a number of automatically controlled high gain amplifiers of critical and expensive design.

In an attempt to simplify the control circuit design, the prior art circuitry has included means responsive to the tracking gate pulse for gating a portion of the video output signal developed by the television camera to a threshold device which generates a pulse signal at the leading edge of the moving target video signal. This pulse signal is generally stored and compared with subsequently generated signals to control the generation of the electronic gate and the position thereof on the viewing screen of the television monitor. While the expense has been reduced and the requirement for high gain amplifiers has been relaxed by this technique, the system remains basically a point source tracking system and is unsuitable in the presence of the background variations in the field of view which occur in random picture information or pattern tracking. Prior art systems of this type are illustrated in the Van Wechel, U.S. Pat. No. 3,257,505.

Other prior art systems such as that disclosed in the Hecker U.S. Pat. No. 3,315,032 approach the problems of several high contrast spots within the field of view by dividing the received image, as viewed by the television camera in the image sensing device, into four quadrants and by providing a tracker for a bright spot in each of the four quadrants whereby the bright spots are fixed with respect to each other in the scene and move together on the viewing screen.

Still another approach to the problem has been the generation of a short duration reference pulse corresponding in time to the center of the electronic window and the clamping of the video signals to the reference level of the reference pulse to provide a target reference system as distinguished from a background reference system. This, of course, necessitates the isolation of the target from its background by the electronic window. These systems are not designed for nor do they function properly for a point source since the clamp pulse is superimposed on top of the target and accuracy suffers as the target size becomes smaller than the width of the clamp pulse. Systems of this type are illustrated in the Kruse, Jr. U.S. Pat. No. 3,341,653.

A common failing of each of the above systems is the lack of a search capability and the necessity for manual acquisition of the target. This lack of a search capability is particularly important in applications such as missile guidance where the target may be momentarily lost due to clouds, etc.

The range closure problems in guidance systems associated with a point or edge tracker becomes, of course, increasingly severe as the image of the target grows with a decrease in the range to the target as the edge or contrast point takes an increasing angular deviation form the center of the target.

It is accordingly an object of the present invention to remedy the deficiencies of the prior art and to provide a novel method and apparatus for pattern recognition.

It is another object of the present invention to provide a novel method and apparatus for searching, recognizing, and tracking a real time target corresponding to a prestored target image or signature.

It is still another object of the present invention to provide a novel method and apparatus suitable for attacking the range closure problems associated with missile guidance by the substitution of different recorded images at preselected ranges.

It is yet another object of the present invention to provide a novel method and apparatus for tracking a target within the field of view of a television camera in which horizontal tracking is accomplished by means of an early-late coincidence gate arrangement and vertical shift is detected by a comparison of each horizontal scan line of the stored pattern with a number of current scan lines.

A further object of the present invention is to provide a novel method and apparatus for successively nondestructively sampling a stored electronic signature of a scanned image for comparison with real time electronic signature.

These and other objects and advantages of the present invention will be readily apparent to one skilled in the art to which the invention pertains from a perusal of the claims and the following detailed description when read in conjunction with the appended drawings.

THE DRAWINGS

The invention as embodied in a tracking system is illustrated in the appended drawings in which.

THE INVENTION EMBODIED AS A PATTERN TRACKER

An understanding of the present invention may, as earlier explained, be facilitated by a consideration thereof in the embodiment of a pattern tracker. With reference now to the preferred pattern tracker embodiment illustrated in the Figures, and particularly to FIG. 1, a lens 10 may be utilized to focus the field of view 11 of a conventional television camera 12. The television camera 12 must, of course, when utilized in a pattern tracker system, be capable of orientation in both azimuth and elevation and may, by way of example, be gimballed and controlled in the manner disclosed in the Guerth U.S. Pat. No. 3,057,953.

Figure 1:
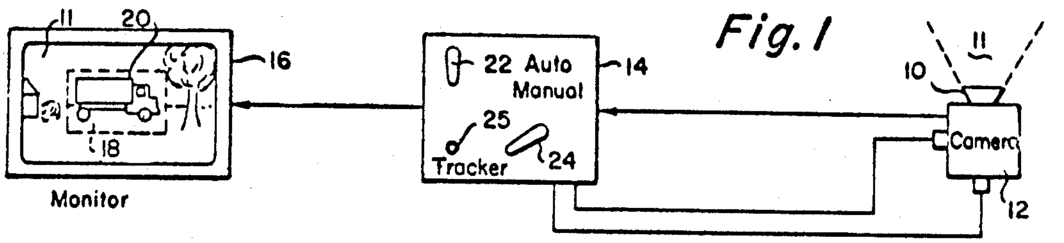
FIG. 1 is a functional block diagram of a tracking system.

The output signal from the camera 12 is conventionally a composite of video, video blanking and sync signals and may be applied to a tracker 14 where the horizontal and vertical sync signals are separated therefrom and the video displayed in the customary manner on the screen of a conventional television cathode ray tube or monitor 16. The visual presentation of the monitor 16, as illustrated in FIG. 1, includes the field of view 11 of the camera 12, an electronic window 18, and a target 20, e.g., a truck, together with other random video information arising from a varied target background. The electronic window 18 may be generated in a conventional manner by signals derived from the horizontal and vertical sync pulses of the television camera in conjunction with control bias signals manually or automatically supplied to position the window 18 within the field of view 11.

When the tracker 14 is operating in the manual mode, i.e., the toggle switch 22 has been flipped to the "manual" position, an operator may position the electronic window 18 within the field of view 11 by appropriate movement of the joy stick 24. Once the button 25 has been depressed by the operator, the tracker will store the electronic signature of the image within the electronic window 18 as a reference. This reference electronic signature may, of course, be prestored and operation of the button 25 thus obviated.

With the toggle switch 22 in the "automatic" position as illustrated, the error signals generated in the circuitry of the tracker 14 by movement of the target 20 within the field of view 11 may be used to position the electronic window 18 on the monitor 16 presentation. These signals, or signals derived from the electronic window bias voltage, may of course also be utilized to control the elevation and azimuth of the television camera 12.

Figure 2:
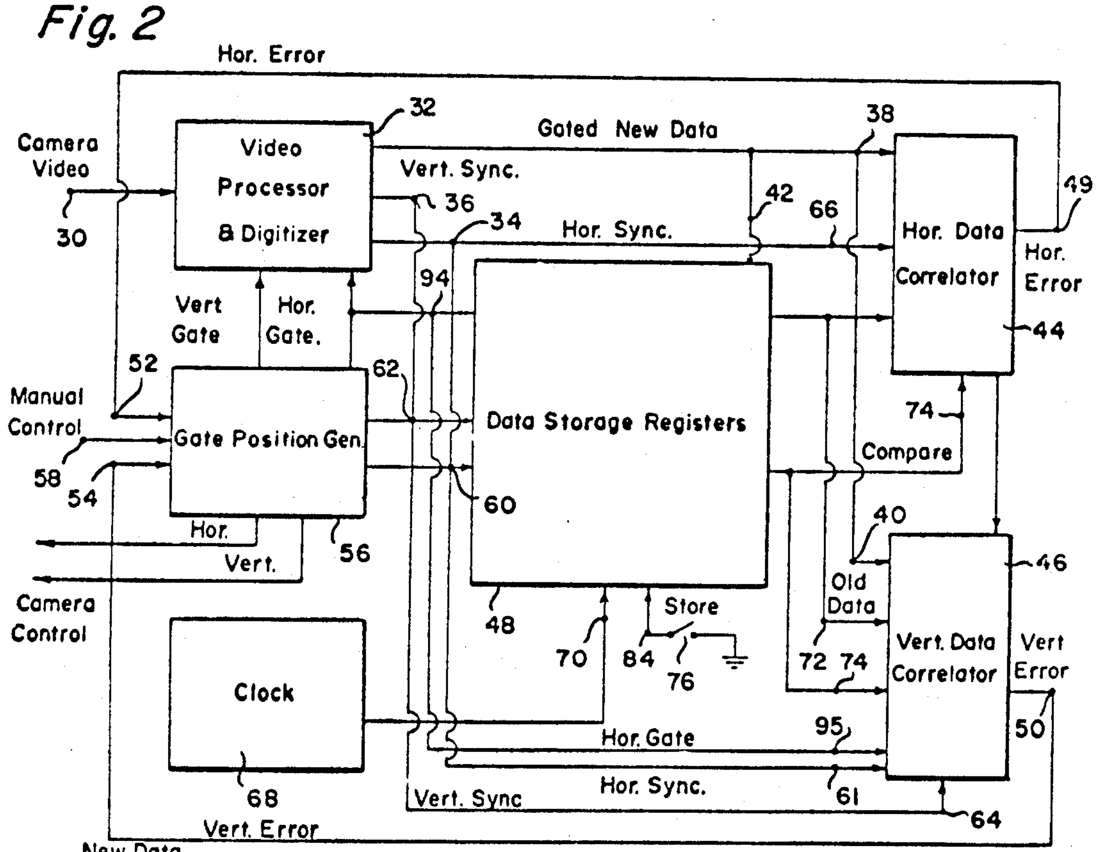
FIG. 2 is a functional block diagram of the tracker of the system of FIG. 1.

The circuitry of the tracker 14 of FIG. 1 is illustrated in greater detail in the block diagram of FIG. 2. With reference now to FIG. 2, the camera video signal, i.e., the composite video and sync signal CAMERA VIDEO from the television camera 12 may be applied to an input terminal 30 of a video processor and digitizer 32. The horizontal and vertical sync signals HOR SYNC and VERT SYNC may be stripped from the CAMERA VIDEO signal in a conventional manner in the video processor and digitizer 32 and applied respectively to the output terminals 34 and 36. The digitized video output signal, the NEW DATA signal, from the video processor and digitizer 32 represents the current or real time data from the camera 12 within the electronic window 18 and may be applied to the input terminals 38, 40 and 42 respectively of the horizontal data correlator 44, the vertical data correlator 46 and the data storage registers 48.

Horizontal error and vertical error signals HOR ERROR and VERT ERROR are produced respectively by data correlators 44 and 46 and may be applied respectively by way of output terminals 49 and 50 to the input terminals 52 and 54 of a gate position generator 56. A MANUAL CONTROL signal derived from the position of the joy stick 24 of FIG. 1 may also be applied to an input terminal 58 of the gate position generator 56.

The gate position generator 56 may also receive the HOR SYNC and VERT SYNC signals from the video processor and digitizer 32 by way of the input terminals 60 and 62 respectively. Vertical and horizontal video gating signals HOR GATE and VERT GATE related to the position of the electronic window 18 may be produced in the gate position generator 56 and applied to the video processor and digitizer 32.

The VERT SYNC signal is also applied from the output terminal 36 of the video processor and digitizer 32 to an input terminal 62 of the data storage register 48 and to an input terminal 64 of the vertical data correlator 46. The HOR SYNC signal from the video processor and digitizer 32 may also be applied to the data storage registers 48 by way of an input terminal 60, to the horizontal data correlator 44 by way of an input terminal 66, and to the vertical data correlator 46 by way of an input terminal 61. A square wave CLOCK signal from a conventional clock circuit 68 may also be applied to an input terminal 70 of the data storage registers 48.

The OLD DATA signal, i.e. the stored electronic signatures, provided on the output terminal 72 of the data storage registers 48 may be directly connected to the like numbered terminal of the horizontal and vertical data correlators 44 and 46. A COMPARE signal may also be generated in the data storage registers 48 and may be directly applied from an output terminal 74 to like numbered input terminal of the horizontal and vertical data correlators 44 and 46. A STORE signal may also be applied to the data storage register 48 by the manual closure of a switch 76 corresponding to the button 25 of FIG. 1.

In operation, the vertical and horizontal gating signals VERT GATE and HOR GATE are generated in the gate position generator and define that area of the monitor raster encompassed by the electronic window 18. The CAMERA VIDEO signal within the electronic window 18 is digitized and passed as the GATED NEW DATA signal by the video processor and digitizer 32 to the data storage registers 48 and the data correlators 44 and 46.

Included in the video processing by which the analog image signature is transformed into digital form, i.e., binary ONE's and ZERO's, is the differentiation of the analog signal to identify the leading and trailing edges of each contrast level change. Band pass filtering and pulse width discrimination of the analog signal may also be utilized in a conventional manner to eliminate noise components from the analog signal. The differentiated pulses may then be shaped to form a digital signature of the image within the electronic window 18 as defined by the HOR GATE and VERT GATE signals from the gate position generator 56.

The HOR SYNC and VERT SYNC signals stripped from the CAMERA VIDEO signal in the video processor and digitizer 32 are applied to the gate position generator 56 to provide a real time reference signal from which the tracking gates can be generated.

Upon initiation of the STORE signal by the manual actuation of the switch 76 by the operator, the digital signature of the image within the confines of the vertical and horizontal tracking gates, i.e., the electronic window 18, will be entered into the data storage registers 48 over a one frame period of raster scan of the television camera 12, generally about 33 ⅓ milliseconds. This stored data may then be non-destructively sampled each successive frame of the raster scan to provide the OLD DATA signals for bit by bit comparison with the real time NEW DATA signal representative of the same segment of the image within the electronic window 18.

Any horizontal movement of the target data is detected in the coincidence gates within the horizontal data correlator 44 described in more detail in connection with FIG. 4. The HOR ERROR signal generated in the horizontal data correlator 44 may be fed back to the gate position generator 56 to complete the horizontal servo loop within the tracker 14. The horizontal tracking gate may, of course, be positioned to null out the HOR ERROR signal.

The GATED NEW DATA signal stored in the data storage registers 48 by the manual operation of the switch 76 is also applied to the vertical data correlator 46 as the OLD DATA signal. As will subsequently be more fully explained in connection with FIG. 5, a vertical shift of the target data within the tracking window 18 will be detected by a serial data comparator circuit which monitors the bit to•bit correlation between the stored line of old data and each of the lines of current or new data with which it is compared. Each register of stored data within the data storage register 48 contains the digital signature of the gated video on one specific horizontal scan line of the television raster scan. The stored line of old data is compared with a number of scan lines of new data symmetrically positioned about the line of old data in subsequent frames of the scanning raster. An analog voltage of the proper polarity and amplitude to represent the vertical direction and number of scan lines which the image has moved vertically relative to its initial position within the electronic window 18 is generated by a delayed decision logic circuit responsive to the line of new data best correlating with the line of old data.

The VERT ERROR output signal from the vertical data correlator 46 is thus an analog voltage indicative of the vertical movement of the target 20 within the electronic window 18 of the monitor 16 of FIG. 1. This VERT ERROR signal may also be fed back to the gate position generator 56 to reposition the tracking gates vertically and to complete the vertical servo loop within the tracker 14.

By means of the HOR ERROR and VERT ERROR signals, the electronic window or tracking gate 18 may be made to track the target 20 within the field of view 11 of the monitor 16 of FIG. 1. Alternatively, or additionally, CAMERA CONTROL signals may be generated in the gate position generator 56 by the HOR ERROR and VERT ERROR signals. These CAMERA CONTROL signals may be applied to the azimuth and elevation gimbals of the television camera 12 of FIG. 1 to effect tracking of the target 20 by the camera 12. Movement of the electronic window 18 within the field of view 11 of the camera 12 may thus be eliminated by the repositioning of the camera 12 if desired.

THE DATA STORAGE REGISTERS

Figure 3:
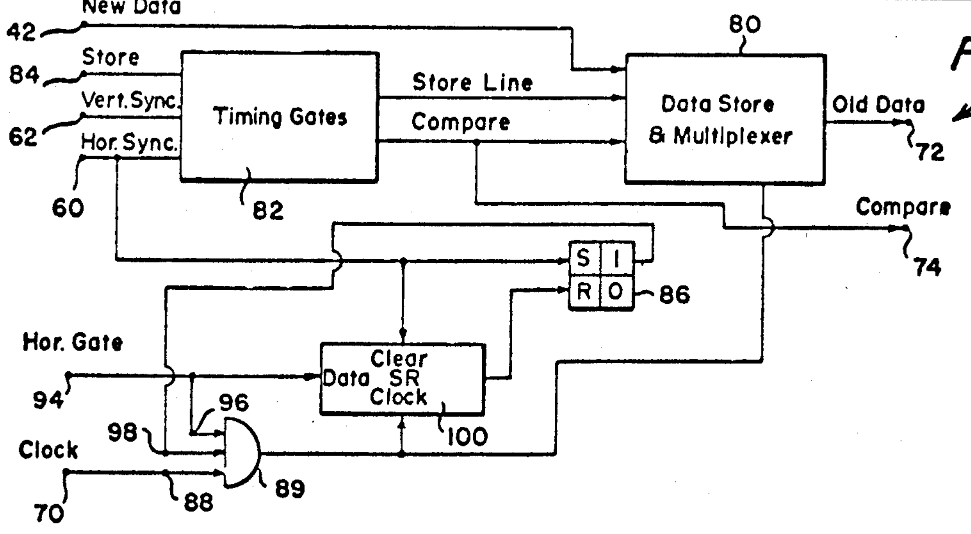
FIG. 3 is a functional block diagram of the data storage registers of the system of FIG. 2.

With reference now to FIG. 3 where like terminals have been given like numerical designations to facilitate an understanding of the connection of the circuit into the block diagram of FIG. 2, the NEW DATA signal is applied directly to the data store and multiplexer 80 by way of an input terminal 42.

The STORE signal generated by the operation of the switch 76 of FIG. 2 may be applied to the timing gates 82 by way of an input terminal 84. Also applied to the timing gates 82 on input terminals 60 and 62 respectively are the HOR SYNC and VERT SYNC signals from the video processor and digitizer 32 of FIG. 2. The HOR SYNC signal may be also applied directly to the set input terminal S of a conventional binary element or flip-flop 86 and to the clear input terminal of a conventional shift register 100.

The COMPARE signal may be generated in the timing gates 82 responsively to the SYNC signals as will hereinafter be described and is applied directly to the data store and multiplexer 80 and to the data correlators 44 and 46 of FIGS. 4 and 5 by way of the output terminal 74.

A STORE LINE signal may also be generated in the timing gates 82 responsively to the STORE and SYNC signals. This STORE LINE signal may be applied directly to the data store and multiplexer 80 wherein the OLD DATA signal is generated for application to the data correlators 44 and 46 by way of the output terminal 72.

The CLOCK signal from the clock 68 of the circuit of FIG. 2 may be applied by way of terminal 70 to one input terminal 88 of a three input AND gate 89. The HOR GATE signal from the gate position generator 56 of FIG. 2 may be applied by way of terminal 94 to a second input terminal 96 of the AND gate 89 and to the data input terminal of the shift register 100. The signal applied to the third input terminal 98 of the AND gate 89 may be taken from the binary 1 output terminal of the flip-flop 86 and the output signal from the AND gate 89 may be applied to the clock input terminal of the shift register 100 and to the data store and multiplexer 80.

In operation, the NEW DATA signal is applied to the data store and multiplexer 80. The STORE signal enables the timing gates 82 so that a STORE LINE signal is periodically generated, e.g. every tenth horizontal scan line within the electronic window 18 during one complete frame period of the raster. This STORE LINE signal in turn enters the digital signature on the associated scan line as a real time NEW DATA signal into one of the storage registers of the data store and multiplexer 80.

The HOR SYNC signal which initiates the storage of every tenth scan line also sets the flip-flop 86 enabling, during the presence of the HOR GATE signal, the AND gate 89 so that the CLOCK signal can be passed through the AND gate 89 to the shift register 100.

The HOR GATE signal is clocked through the shift register 100 by the CLOCK signal from the AND gate 89 to reset the flip-flop 86 thereby disabling the AND gate 89 and removing the CLOCK signal from the data store and multiplexer 80 and the shift register 100.

Inasmuch as the CLOCK signal was present on the output terminal of the AND gate 89 for the interval between the initiation of the HOR GATE signal and the application of the requisite number of CLOCK signal pulses to the shift register 100, the CLOCK signal will be applied to the data store and multiplexer 80 during this period. These CLOCK signals are utilized in the data store and multiplexer 80 to recycle the OLD DATA signals stored in the storage registers during the presence of the COMPARE signal. These CLOCK signals also enter the NEW DATA signals into the storage registers when a STORE LINE signal is applied thereto. The bit length of storage capacity of shift register 100 is, of course, the same as the length of each of the storage registers in the data store and multiplexer 80.

THE HORIZONTAL DATA CORRELATOR

Figures 4, 6:
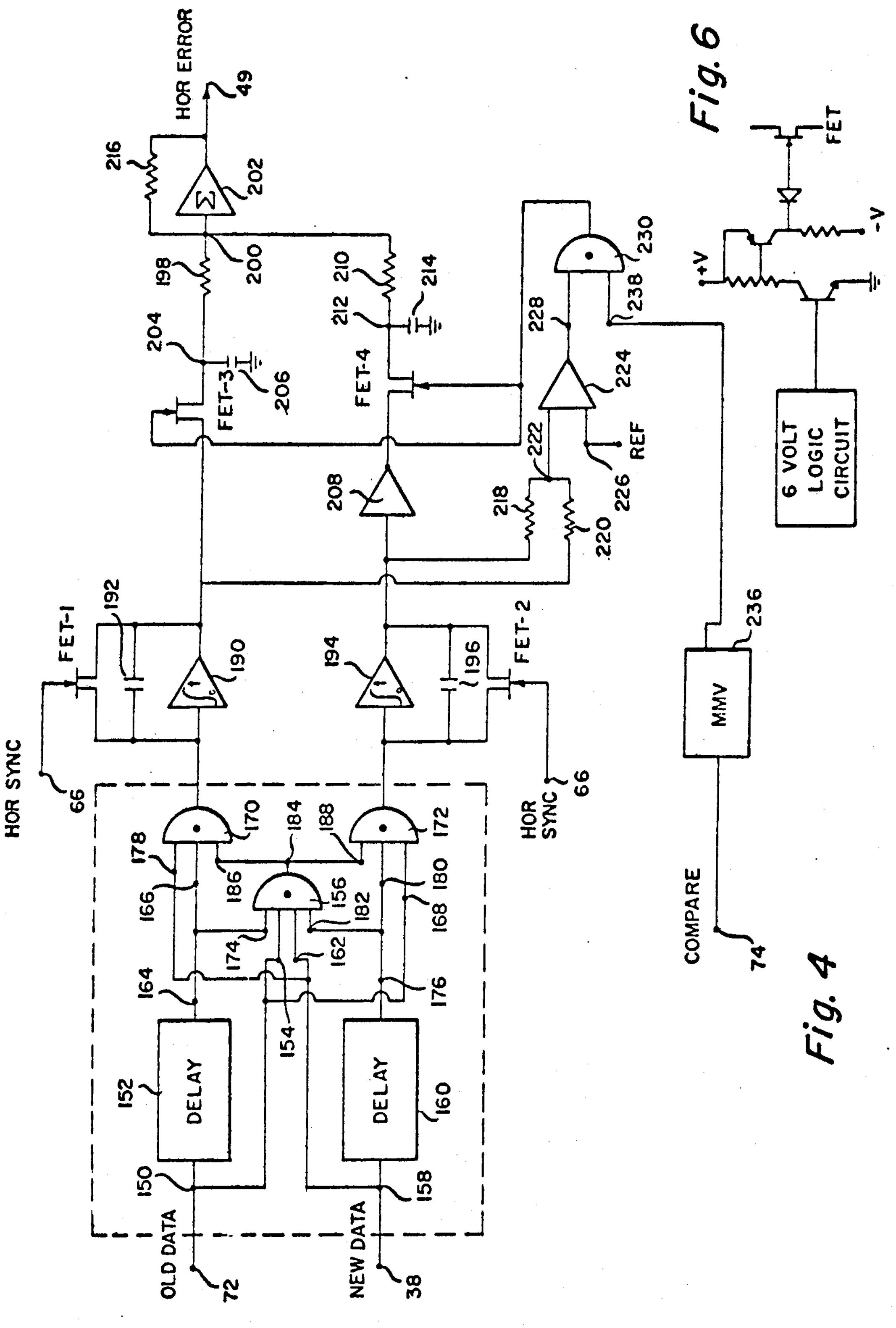
FIG. 4 is a functional block diagram of the horizontal data correlator of the system of FIG. 2.
FIG. 6 is a schematic circuit diagram of a transistor interface circuit.

The horizontal data correlator 44 of FIG. 2 is shown in greater detail in FIG. 4 wherein like terminals have been given like numerical designation to facilitate an understanding of the connection thereof into the circuit of FIGS. 2 and 3. With reference now to FIG. 4, the OLD DATA signal from the data storage registers 48 of FIG. 2 may be supplied to the input terminal 150 of a delay circuit 152 and to one input terminal 154 of a four input terminal NAND gate 156 and to one input terminal 168 of a three input terminal NAND gate 172. The NEW DATA signal derived from the video processor and digitizer 32 of FIG. 2 may be applied by way of the input terminal 38 to the input terminal 158 of a similar delay circuit 160 to a second input terminal 162 of the NAND gate 156 and to an input terminal 178 of a three input terminal NAND gate 170. The output terminal 164 of the delay circuit 152 may be directly connected respectively to one input terminal 166 of the NAND gate 170 and to an input terminal 174 of the NAND gate 156.

Similarly, the output terminal 176 of the delay circuit 160 may be directly connected respectively to an input terminal 180 of the NAND gate 172 as well as to a fourth input terminal 182 of the NAND gate 156. The output terminal 184 of the NAND gate 156 may be directly connected to the input terminals 186 and 188 respectively of the NAND gates 170 and 172.

The circuit of FIG. 4 as thus far described is described and claimed in the U.S. application Ser. No. 509,993, filed Nov. 26, 1965, by Lamar Harmon, entitled "Binary Phase Comparator" and assigned to the assignee of the present invention and herein incorporated by reference. The Harmon application issued as U.S. Pat. No. 3,521,172 on July 21, 1970.

The output signal from the NAND gate 170 may be applied to an operational amplifier 190 having a capacitor 192 connected in the feedback path thereof so that an averaging function can be performed. The capacitor 192 may be bridged by the base electrodes of a field effect transistor FET–1 whose trigger electrode is directly connected, by way of the input terminal 66, to the output terminal 34 of the video processor and digitizer 32 of FIG. 2.

Similarly, the output signal from the NAND gate 172 may be applied directly to a similar operational amplifier 194 having a capacitor 196 connected in the feedback path thereof. The capacitor 196 may likewise be bridged by the base electrodes of a field effect transistor FET–2 whose trigger electrode may be directly connected to the output terminal 34 of the video processor and digitizer 32 of FIG. 2 to receive the HOR SYNC signal.

The output signal from the operational amplifier 190 may be applied through the base electrodes of a field effect transistor FET–3 and a series resistor 198 to the input terminal 200 of a summing amplifier 202. The junction 204 of the field effect transistor FET–3 and the resistor 198 may be isolated from ground potential by means of a capacitor 206.

The output signal from the operational amplifier 194 may be inverted in polarity in a conventional unity gain inverter 208 and applied through the base electrodes of a field effect transistor FET–4 and a series resistor 210 to the input terminal 200 of the summing amplifier 202. The junction 212 of resistor 210 and the field effect transistor FET–4 may be isolated from ground potential by a capacitor 214. Degenerative feedback for the summing amplifier 202 may be provided by a resistor 216 and the output of the amplifier 202 may be applied to the output terminal 49 as the HOR ERROR signal earlier discussed.

The output signal from the integrating or operational amplifiers 190 and 194 may be applied respectively through resistors 220 and 218 to common input terminal 222 of a conventional voltage comparator 224. A positive reference potential is applied to the other input terminal 226 of the voltage comparator 224 from a suitable source (not shown). The output signal from the voltage comparator 224 may be applied to one input terminal 228 of a two input AND gate 230 and the output signal therefrom applied directly to the trigger electrodes of the field effect transistors FET–3 and FET–4.

The interfacing of the transistor to the logic circuit, typically 6 volt, may require a voltage level shifting circuit in the trigger electrode circuit. These circuits may be conventional in design and may, by way of example, be of the type illustrated in FIG. 6.

The COMPARE signal from the terminal 74 of the data storage registers 48 of FIGS. 2 and 3 may be applied to the trigger input terminal of a conventional monostable or one-shot multivibrator 236 of FIG. 4. The output signal taken from the binary 1 output terminal of the monostable or one-shot multivibrator 236 may be applied to the other input terminal 238 of the two-input AND gate 230.

In operation, the circuit of Dr. Lamar Harmon provides a bit by bit comparison of the OLD DATA and NEW DATA signals. The average width of the output signal therefrom is indicative of the horizontal movement of the target and the direction of the movement is indicated by the terminal upon which the output signal appears.

The operational amplifiers 190 and 194 of FIG. 4 together comprise a balanced averaging integrator which is reset to zero by the HOR SYNC signal at the beginning of each scan line.

The positive potential of the integrated output signal of the Harmon circuit is compared with the positive reference voltage in the voltage comparator 224. The reference voltage is, of course, desirably adjusted to a level which will prevent the enabling of the AND gate 230 by the buildup of stray signals in the integrators.

The trailing edge of the COMPARE signal, nine scan lines wide in the illustrated embodiment, may be used to trigger the one-shot multivibrator 236 and the positive output pulse therefrom is passed through the AND gate 230 if enabled by the output signal from the voltage comparator 224 to trigger the transistors FET–3 and FET–4. The output potential of the operational amplifier 190 or 194 is transferred to the associated holding capacitor 206 or 214 upon the triggering of the transistors FET–3 and FET–4.

The change in polarity provided by the inverter 208 provides an indication of the direction of movement and the bipolar output signal of the summing amplifier will thus indicate both the direction and the amount of movement of the target.

The comparison between the OLD DATA and NEW DATA signals is, of course, made between each stored line of OLD DATA and the associated nine lines of NEW DATA. The correlated signals from these comparisons may be averaged to provide a single HOR ERROR signal.

THE VERTICAL DATA CORRELATOR

Figure 5:
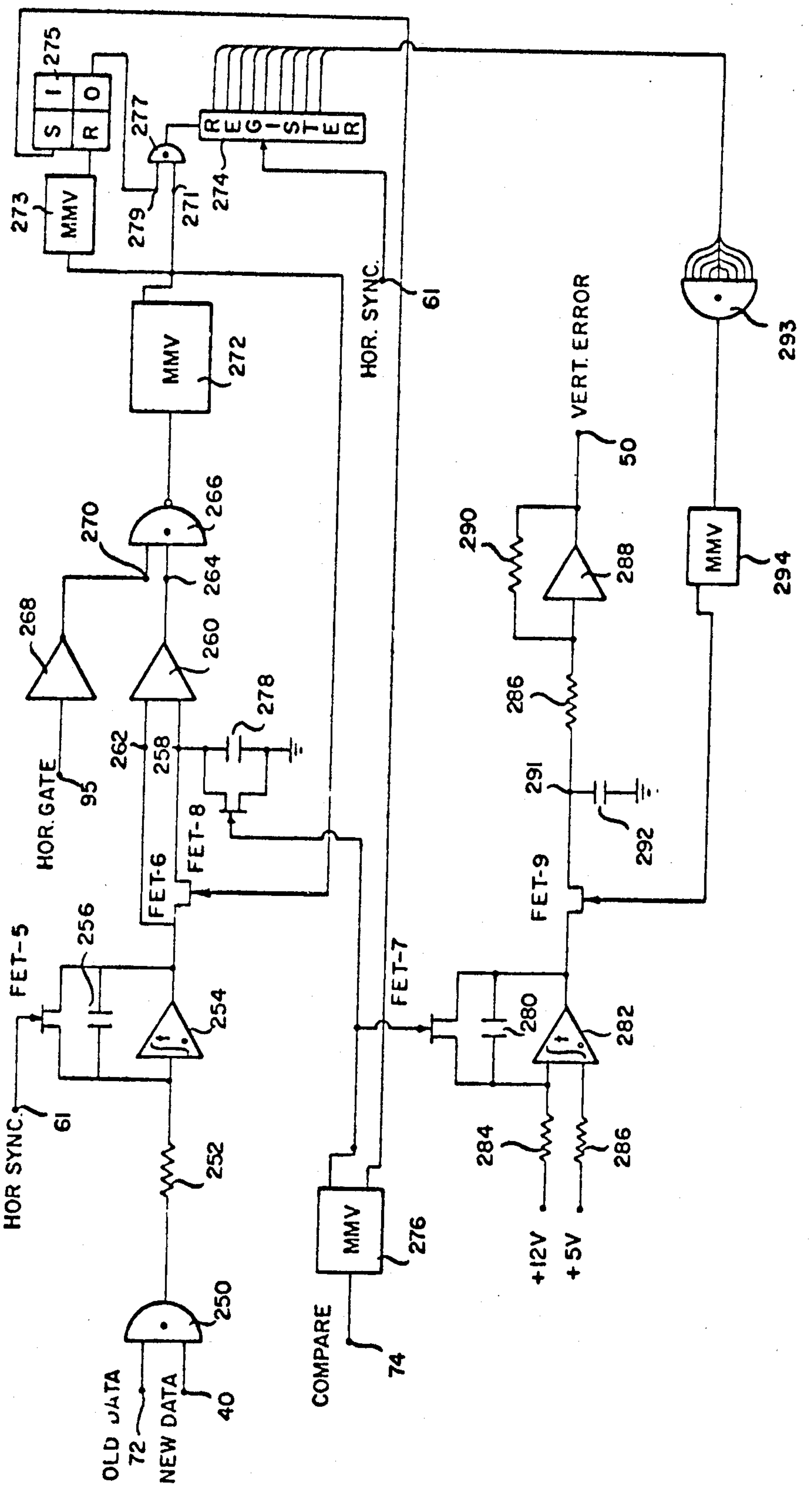
FIG. 5 is a functional block diagram of the vertical data correlator of the system of FIG. 2.

The vertical data correlator 46 of FIG. 2 is illustrated in greater detail in FIG. 5 wherein like terminals have also been given like numerical designations to facilitate an understanding of the connection thereof to the circuit of FIGS. 2 and 3. With reference now to FIG. 5, the OLD DATA signal from the data storage registers 48 of FIGS. 2 and 3 and the NEW DATA signals from the video processor and digitizer 32 of FIG. 2 may be applied respectively to the two input terminals 72 and 40 of a two input AND gate 250. The output signal from the AND gate 250 may be applied through a resistor 252 to the input terminal of an operational amplifier 254 having a capacitor 256 in the feedback path thereof so that an averaging function can be performed. The capacitor 256 may be bridged by the base electrodes of a field effect transistor FET–5 whose trigger electrode is connected to receive, by way of the input terminal 61, the HOR SYNC signal from the output terminal 34 of the video processor and digitizer 32 of FIG. 2.

The output signal from the operational amplifier 254 may be applied through the base electrodes of the field effect transistor FET–6 to one input terminal 258 of a conventional voltage comparator 260 and may be directly connected to the other input terminal 262 thereof. The output signal from the voltage comparator 260 may be applied to one input terminal 264 of a two input NAND gate 266. The HOR GATE signal from the gate position generator 56 of FIG. 2 may be inverted in polarity in a conventional inverter 268 and applied to the other input terminal 270 of the NAND gate 266. The output signal from the NAND gate 266 may be applied to the trigger input terminal of a conventional monostable or one-shot multivibrator 272 and the output signal taken from the binary 1 output terminal thereof applied to the trigger input terminal of a conventional monostable or one-shot multivibrator 273, to an input terminal 271 of a two input terminal AND gate 277, and to the trigger electrode of the field effect transistor FET–6. The binary 0 output terminal of the multivibrator 273 may be connected to the reset input terminal R of a conventional bistable multivibrator or flip-flop 275 whose binary 0 output terminal is in turn connected to the input terminal 279 of the AND gate 277. The output terminal of the AND gate 277 may be connected to data input terminal of a conventional shift register 274.

The COMPARE signal from the data storage registers 48 of FIG. 2 may be applied to the trigger input terminal of a conventional monostable or one-shot multivibrator 276 in FIG. 5 which triggers on the trailing edge of the input signal and the output signal taken from the binary 1 output terminal thereof applied to the trigger electrodes respectively of a pair of field effect transistors FET–7 and FET–8. The binary 0 output terminal of the multivibrator 276 may be directly connected to the set input terminal S of the flip-flop 275. The input terminal 258 of the voltage comparator 260 may be isolated from ground potential by a capacitor 278 and the capacitor 278 may be in turn bridged by the base electrodes of the transistor FET–8.

The base electrodes of the transistor FET–7 in FIG. 5 also bridge a capacitor, capacitor 280 in the feedback path of an operational amplifier 282 to which 12 volt and 5 volt positive potentials are respectively applied through resistors 284 and 286. The output signal from the operational amplifier 282 may be applied through the base electrodes of a field effect transistor FET–9 and a resistor 286 to the input terminal of an operational amplifier 288 having a resistor 290 in the degenerative feedback path thereof. The junction 291 between the resistor 286 and the transistor FET–9 may be isolated from ground potential by a capacitor 292. The output signal from the operational amplifier 288 may be taken as the VERT ERROR signal and applied by way of the output terminal 50 to the gate position generator 56 of FIG. 2.

The parallel readout of the data in the register 274, nine bits in the illustrated embodiments, may be applied to the nine input terminals of a nine input NAND gate 293 whose output terminal may be directly connected to the trigger input terminal of a conventional monostable or one-shot multivibrator 294, the binary 1 output terminal of which may be connected to the trigger electrode of the transistor FET–9.

In operation, the operational amplifier 254 of FIG. 5 is reset at the beginning of each horizontal scan line by the HOR SYNC signal and thereafter provides a signal related in amplitude to the coincidence of the bit by bit comparison of the OLD DATA and NEW DATA signals in the AND gate 250. The output signal of the operational amplifier 254 may be applied directly to the voltage comparator 260 via the input terminal 262. Each time that the potential on the input terminal 262 exceeds that of the reference potential on the input terminal 258, the voltage comparator 260 provides an enabling signal to the NAND gate 266.

The NAND gate 266 is disabled for the duration of the HOR GATE signal by the inversion thereof in the inverter 268. The multivibrator 272 is triggered by the leading edge of the output signal from the NAND gate 266 each time the potential of the operational amplifier 254 exceeds the reference potential on the input terminal 258 of the voltage comparator 260. The pulse of voltage from the multivibrator 272 ultimately provides the data input signal to the shift register 274 and this data is shifted therein by the HOR SYNC signals applied to the clock input terminal 61.

The output signal from the multivibrator 272 may also be used to trigger the transistor FET–6 thereby transferring the energy accumulated by the operational amplifier 254 to the holding capacitor 278 as the new or updated reference potential for the voltage comparator 260.

Since the reference potential on the input terminal 258 of the voltage comparator 260 is zero initially as a result of the occurrence of the COMPARE signal as hereinafter explained, any coincidence of data bits in the OLD DATA and NEW DATA signals in the first scan line of data compared in the AND gate 250 will trigger the multivibrator 272 and reset the flip-flop 275 on the trailing edge of the multivibrator 272 output pulse. The AND gate 277 will thus be enabled so that succeeding pulses from the multivibrator 272 will be clocked into the shift register 274 as binary 1 bits by the HOR SYNC signal.

The energy level of the operational amplifier 254 resulting from averaging the coincident bits in the OLD DATA and NEW DATA signals during the first scan line comparison will be transferred to the holding capacitor 278 as the new reference potential for the voltage comparator 260.

Assuming that the output potential of the operational amplifier 254 resulting from the second comparison exceeds the reference potential established by the preceding scan line, the multivibrator 272 will be triggered and the next HOR SYNC signal will clock a binary ONE into the shift register 274 while resetting the operational amplifier 254 by the triggering of the transistor FET–6.

The reference potential of the voltage comparator 260 is in this manner continually updated until the line of maximum coincidence of OLD DATA and NEW DATA signals is obtained. Thereafter, of course, only binary ZERO's can be clocked into the shift register 274 by the HOR SYNC signals. After the stored line of OLD DATA has been successively compared with the corresponding line of NEW DATA and the four lines symmetrically arranged on both sides thereof, the number of HOR SYNC clocking pulses necessary to clear the shift register 274, i.e. all binary ZERO's, indicates the amount of vertical shift of the target. This all binary ZERO condition of the shift register 274 is detected in the nine input NAND gate 292 which then triggers the transistor FET-9 to sample the output signal of the amplifier 282 and to provide the VERT ERROR signal.

The triggering of the multivibrator 276 by the trailing edge of the COMPARE signal through the triggering of the transistor FET–7 resets the operational amplifier 282 simultaneously with the zeroing of the reference potential of the voltage comparator 260 by the triggering of the transistor FET–8. The output signal of the operational amplifier 282 immediately becomes −5 volts and thereafter rises linearly towards the +12 volts applied thereto through the resistor 284, and reaching +5 volts in ten horizontal scan periods. The potential on the output terminal of the operational amplifier 282 will thus relate to the elapsed time since the nine scan line comparison ended. This potential will be sampled when the multivibrator 294 triggers the transistor FET–9 and will be applied to the capacitor 292 where it represents in polarity the direction of movement of the target and in amplitude the amount thereof. This amplified potential is, of course, the VERT ERROR signal appearing on the output terminal 50.

The possibility of deriving a false vertical error signal from a target having the same vertical signature over the nine horizontal lines compared is obviated by the present circuitry. Since the energy developed on each of the nine line comparisons would be equal, only the binary ONE from the first comparison would be entered into the register(indicating a four horizontal line movement)in the absence of circuitry for inhibiting the entry of the first pulse generated.

DESIGN CONSIDERATIONS

To fully appreciate the operation of the system described *supra*, the nature of the television signal must, of course, be understood. The standard television scan role is 525 scan lines per frame interlaced with the VERT SYNC signal indicating the beginning of each new field and the HOR SYNC signal indicating the commencement of each horizontal scan line.

The present invention is, of course, easily adaptable to any scan line per frame ratio and to non-interlaced as well as interlaced scan. If interlaced scan is utilized, either or both of the fields of the frame may be utilized for comparison purposes.

Moreover, the present system of selecting each tenth scan line for storage is arbitrary as is the number of scan lines of the NEW DATA signal to be compared with the OLD DATA signal. The number of scan lines of the NEW DATA signal to be compared to each line of the OLD DATA signal is, of course, determined by the maximum rate of vertical movement of the target anticipated. If, for example, the target may be expected to move vertically N number of scan lines per raster frame, the number of lines to be compared should be 2N+2.

The VERT ERROR signals generated for each scan line stored may, of course, be averaged over the entire frame to derive the VERT ERROR signal applied to the gate position generator.

The frequency of the clock and the number of bits of storage in each register in the data storage registers are, of course, determined by the minimum target width, the desired horizontal width of the tracking gate and the band width of the video signal. The frequency of the CLOCK signal will, of course, determine the tracking accuracy of the system.

The present invention has been described in a pattern tracking embodiment for purposes of illustration only. The invention is therefore to be considered or limited only by the language of the appended claims when accorded a full range of equivalents.

I claim:

1. A real time repetitive scan pattern recognition system comprising:
- a source of digital signature signals over a plurality of scan lines in successive frames;
- means for selectively storing the digital signature of a predetermined plurality of scan lines in a predetermined frame;
- means for correlating the stored digital signature signal with the digital signature signal of a plurality of scan lines of a subsequent frame, and
- said last named means including means for averaging the correlation result to ascertain the degree of similarity between the stored digital signature signal and the digital signature signal of scan lines of subsequent frames.

2. A real time repetitive scan pattern recognition system comprising:
- a source of digital signature signals over a plurality of scan lines in successive frames,
- means for selectively storing the digital signature signals of a predetermined plurality of scan lines in a predetermined frame, and
- means for correlating said stored digital signature signals with the digital signature signals of a plurality of scan lines of a subsequent frame,
- said correlating means including means for averaging the correlation of each of said stored digital signature signals.

3. The system of claim 2 including early/late coincidence detecting means for bit-by-bit comparison of said stored digital signature signal with the digital signature signal of a family of corresponding scan lines of a subsequent frame.

4. The system of claim 2 wherein said source comprises:
- a television camera for generating an analog video image signature signal; and
- means for processing said analog video signature signal to remove horizontal and vertical sync signals and to convert said analog video image signature signal into a digital signature signal.

5. The system of claim 2 including gating means for limiting the storing and correlating of said digital signature signals to a selected portion of said repetitive scan pattern.

6. The system of claim 2 wherein said correlation means includes means for generating a first signal having an amplitude related to the bit-by-bit coincidence of said stored digital signature signal and each of the digital signature signals of a predetermined plurality of scan lines within a subsequent frame symmetrically positioned about the scan line corresponding to the scan line of said stored digital signature signals.

7. A real time repetitive scan pattern recognition system comprising:
- a source of digital signature signals over a plurality of scan lines in successive frames,
- said source comprising a television camera for generating an analog video image signature signal,
- means for processing said analog video signature signal to remove horizontal and vertical sync signals and to convert said analog video image signature signal into a digital signature signal,
- said processing means including means in series circuit for identifying the leading and trailing edges of a contrast level change in said analog video image signature signal, bandpass filtering means, and pulse width discrimination means,
- means for selectively storing the digital signature of a predetermined scan line in a predetermined frame, and
- means for correlating said stored digital signature signal with the digital signature signal of a plurality of scan lines of a subsequent frame.

8. A real time repetitive scan pattern recognition system comprising:
- a source of digital signature signals over a plurality of scan lines in successive frames,
- means for selectively storing the digital signature of a predetermined scan line in a predetermined frame,
- means for correlating said stored digital signature signal with the digital signature signal of a plurality of scan lines of a subsequent frame,
- said correlation means including means for generating a first signal having an amplitude related to the bit-by-bit coincidence of said stored digital signature signal and each of the digital signature signals of a predetermined plurality of scan lines within a subsequent frame symmetrically positioned about the scan line corresponding to the scan line of said stored digital signature signals,
- said correlation means further comprising means for generating a second signal responsively to the favorable comparison of each of said first signals with the greatest amplitude of the preceding ones of said generated first signals, and
- means for determining the number of unfavorable comparisons subsequent to the generation of the last of said second signals.

9. The system of claim 8 wherein said second signal generating means comprises:
- a voltage comparator,
- storage means,
- means for applying said first signal to one terminal of said voltage comparator, and
- first gate means for applying said first signal to said storage means when enabled, said first gate means being enabled in response to a favorable comparison in said voltage comparator of the amplitude of said first signal to the amplitude of the signal stored in said storage means.

10. The system of claim 8 wherein said unfavorable comparison determining means comprises:

a shift register having a capacity equal to said predetermined plurality of comparisons, circuit means responsive to the first favorable comparison for loading a signal having a first amplitude into said shift register upon each subsequent favorable comparison and for loading a signal of a second amplitude into said shift register upon each unfavorable comparison, and second gate means for detecting the absence of signals of said first amplitude in said shift register.

11. The system of claim 8 including means for processing said analog video signature signals to remove horizontal and vertical sync signals and to convert said analog video image signature signal into a digital signature signal;

early/late coincidence detecting means for bit-by-bit comparison of said stored digital signature signal with the digital signature signal of the corresponding scan line of a subsequent frame; and gating means for limiting the storing and correlation of said digital signature signals to a selected portion of said repetitive scan pattern;

said determining means comprising a shift register having a capacity equal to said predetermined plurality of said comparisons, circuit means for loading a signal of a first amplitude into said shift register upon each favorable comparison and for loading a signal of a second amplitude into said shift register upon each unfavorable comparison, and second gate means for detecting the absence of signals of said first amplitude in said shift register;

said source comprising a television camera for generating an analog video image signature signal.

12. A repetitive scan pattern recognition system comprising:

a source of digital signature signals over a plurality of scan lines in successive frames;

means for selectively storing the digital signature signal of a predetermined plurality of scan lines in a predetermined frame;

early/late coincidence detecting means for bit-by-bit comparison of the stored digital signature signal of each of said predetermined plurality of scan lines with the digital signature signal of the corresponding scan line in a subsequent frame; and means for averaging the early/late coincidence of said scan line comparisons.

13. The system of claim 12 wherein said source comprises:

a television camera for generating an analog video image signature signal, and means for removing sync signals from said analog video image signature signal and for converting said analog video image signature signal into a digital video signature signal; and including means for limiting the storing and comparison of the digital video signature signal to a selected position of said repetitive scan pattern.

14. The real time method of pattern recognition comprising the steps of:

a. generating a plurality of digital signature signals over a plurality of scan lines in successive frames;

b. selectively storing the digital signature signals of a predetermined plurality of scan lines within a predetermined frame;

c. comparing the digital signature signals of each of the stored scan lines with the digital signature signal of a plurality of scan lines in predetermined relative positions in a subsequent frame; and d. averaging the displacement in position from the corresponding scan line of the best of the comparisons of each of the stored digital signature signals.

15. The method of claim 14 wherein the stored digital signature signal of each scan line is compared with the generated digital signature signals of the corresponding scan line in a subsequent frame and with the generated digital signature signals of a plurality of scan lines disposed symmetrically thereto.

16. The method of claim 15 wherein the degree of coincidence of each comparison is measured against the highest degree of coincidence of the previous comparisons of the stored digital signature signal of the same scan line, and wherein the number of unfavorable comparisons subsequent to a favorable comparison are counted to determine the displacement of maximum coincidence of the stored digital signature signal and the digital signature signal of the plurality of scan lines with which it is compared.

17. The real time method of pattern recognition comprising the steps of:

a. generating a plurality of digital signature signals over a plurality of scan lines in successive frames;

b. selectively storing the digital signature signal of a predetermined plurality of scan lines within a predetermined frame;

c. detecting the bit-by-bit early/late coincidence of each of the plurality of stored digital signature signals with the digital signature signal of the corresponding scan line in a subsequent frame; and d. averaging the early/late coincidence of each of the detections.

* * * * *